US010499185B2

(12) United States Patent
Scellato et al.

(10) Patent No.: US 10,499,185 B2
(45) Date of Patent: Dec. 3, 2019

(54) ENERGY-EFFICIENT LOCATION DETERMINATION

(71) Applicant: GOOGLE LLC, Mountain View, CA (US)

(72) Inventors: Salvatore Scellato, London (GB); Matthew Nicholas Stuttle, Lewes (GB); Chandrasekhar Thota, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/985,221

(22) Filed: May 21, 2018

(65) Prior Publication Data

US 2018/0279076 A1 Sep. 27, 2018

Related U.S. Application Data

(63) Continuation of application No. 14/179,209, filed on Feb. 12, 2014, now Pat. No. 9,986,375.

(51) Int. Cl.
H04W 4/021 (2018.01)
G01S 5/02 (2010.01)

(52) U.S. Cl.
CPC ............ H04W 4/021 (2013.01); G01S 5/0221 (2013.01); G01S 5/0252 (2013.01); Y02D 70/142 (2018.01);
(Continued)

(58) Field of Classification Search
CPC ....... H04W 4/021; H04W 4/022; H04W 4/12; H04W 64/003; H04W 4/023;
(Continued)

(56) References Cited

U.S. PATENT DOCUMENTS 6,026,375 A    2/2000  Hall et al.
6,298,125 B1  10/2001  Goldberg et al.
(Continued)

FOREIGN PATENT DOCUMENTS

CN    101479757 A    7/2009
CN    102082995 A    6/2011
(Continued)

OTHER PUBLICATIONS

"Chinese Office Action issued in Chinese Application No. 201480046073.2", dated Jul. 11, 2017, 7 pages of English Translation and 6 pages of Chinese Office Action.
(Continued)

Primary Examiner — Natasha W Cosme
(74) Attorney, Agent, or Firm — Johnson, Marcou & Isaacs, LLC

(57) ABSTRACT

A location management system identifies points of interest that may be of interest to one or more users. The location management system defines a geofence boundary encompassing a particular point of interest. When the location management system determines that the user device is inside the geofence boundary—but not, for example, when the location management system determines that the user determines that the user device is outside the geofence boundary—the location management system instructs the user device to determine wireless signals available to the user device. The location management system then receives wireless signal data from the user device for available wireless signals. By matching the received wireless signal data to known wireless signals available at the identified points of interest, the location management system determines that the user device (and hence the user) is at the point of interest.

20 Claims, 5 Drawing Sheets

(52) U.S. Cl.
CPC .......... *Y02D 70/144* (2018.01); *Y02D 70/164* (2018.01); *Y02D 70/166* (2018.01)

(58) Field of Classification Search
CPC ..... H04W 4/027; H04W 4/028; H04W 4/206; H04W 64/006
USPC ........... 455/456.3, 456.6, 456.1; 340/539.13, 340/539.11
See application file for complete search history.

(56) References Cited

U.S. PATENT DOCUMENTS

| | | |
|---|---|---|
| 6,414,635 B1 | 7/2002 | Stewart et al. |
| 6,490,432 B1 | 12/2002 | Wegener et al. |
| 6,587,835 B1 | 7/2003 | Treyz et al. |
| 7,062,469 B2 | 6/2006 | Meyers et al. |
| 7,353,034 B2 | 4/2008 | Haney |
| 7,519,470 B2 | 4/2009 | Brasche et al. |
| 7,529,850 B2 | 5/2009 | Verma et al. |
| 7,676,369 B2 | 3/2010 | Fujimoto et al. |
| 7,865,308 B2 | 1/2011 | Athsani et al. |
| 8,019,532 B2 | 9/2011 | Sheha et al. |
| 8,229,473 B1 | 7/2012 | De La Rue |
| 8,335,524 B2 | 12/2012 | Shutter |
| 8,335,990 B2 | 12/2012 | Arrasvuori |
| 8,385,964 B2 | 2/2013 | Haney |
| 8,427,308 B1 | 4/2013 | Baron, Sr. et al. |
| 8,463,280 B1 | 6/2013 | Lim et al. |
| 8,755,824 B1 | 6/2014 | Wang et al. |
| 8,798,646 B1 | 8/2014 | Wang et al. |
| 8,924,147 B2 | 12/2014 | Vellaikal et al. |
| 8,930,162 B2 | 1/2015 | Wang et al. |
| 9,049,555 B2 | 6/2015 | Wang et al. |
| 9,144,008 B2 | 9/2015 | Attar et al. |
| 9,341,479 B2 | 5/2016 | Repenning et al. |
| 9,596,563 B2 | 3/2017 | Wang et al. |
| 9,788,159 B2 | 10/2017 | Wang et al. |
| 9,872,147 B2 | 1/2018 | Wang et al. |
| 2001/0001145 A1 | 5/2001 | Barnett et al. |
| 2001/0014868 A1 | 8/2001 | Herz et al. |
| 2002/0095333 A1 | 7/2002 | Jokinen et al. |
| 2002/0133424 A1 | 9/2002 | Joao |
| 2003/0004802 A1 | 1/2003 | Callegari |
| 2003/0004831 A1 | 1/2003 | Owens |
| 2003/0005056 A1 | 1/2003 | Yamamoto et al. |
| 2003/0050863 A1 | 3/2003 | Radwin |
| 2003/0220835 A1 | 11/2003 | Barnes, Jr. |
| 2004/0181461 A1 | 9/2004 | Raiyani et al. |
| 2004/0203644 A1 | 10/2004 | Anders et al. |
| 2004/0215517 A1 | 10/2004 | Chen et al. |
| 2005/0029342 A1 | 2/2005 | Sugimoto et al. |
| 2005/0144013 A1 | 6/2005 | Fujimoto et al. |
| 2005/0209921 A1 | 9/2005 | Roberts et al. |
| 2006/0011721 A1 | 1/2006 | Olsen et al. |
| 2006/0099971 A1 | 5/2006 | Staten et al. |
| 2007/0167173 A1 | 7/2007 | Halcrow et al. |
| 2007/0275736 A1 | 11/2007 | Baek et al. |
| 2007/0281690 A1 | 12/2007 | Altman et al. |
| 2008/0070588 A1 | 3/2008 | Morin |
| 2008/0076451 A1 | 3/2008 | Sheha et al. |
| 2008/0176583 A1 | 7/2008 | Brachet et al. |
| 2008/0248815 A1 | 10/2008 | Busch |
| 2008/0258960 A1 | 10/2008 | Rosenberg et al. |
| 2009/0005987 A1 | 1/2009 | Vengroff et al. |
| 2009/0012955 A1 | 1/2009 | Chu et al. |
| 2009/0047972 A1 | 2/2009 | Neeraj |
| 2009/0055094 A1 | 2/2009 | Suzuki |
| 2009/0081994 A1 | 3/2009 | Drobot et al. |
| 2009/0137255 A1 | 5/2009 | Ashley, Jr. et al. |
| 2009/0167553 A1 | 7/2009 | Hong et al. |
| 2009/0181695 A1 | 7/2009 | Wirola et al. |
| 2009/0259396 A1 | 10/2009 | He |
| 2009/0307096 A1 | 12/2009 | Antonellis |
| 2009/0319166 A1 | 12/2009 | Khosravy et al. |
| 2010/0017126 A1 | 1/2010 | Holcman et al. |
| 2010/0190513 A1 | 7/2010 | Andreasson |
| 2010/0253508 A1 | 10/2010 | Koen et al. |
| 2010/0322214 A1 | 12/2010 | Workman et al. |
| 2011/0028160 A1 | 2/2011 | Roeding et al. |
| 2011/0040626 A1 | 2/2011 | Lin |
| 2011/0047509 A1 | 2/2011 | Arrasvuori |
| 2011/0065423 A1 | 3/2011 | Karaoguz et al. |
| 2011/0099047 A1 | 4/2011 | Weiss et al. |
| 2011/0103360 A1 | 5/2011 | Ku et al. |
| 2011/0153143 A1 | 6/2011 | O'neil et al. |
| 2011/0209221 A1 | 8/2011 | Hanson et al. |
| 2011/0238476 A1 | 9/2011 | Carr et al. |
| 2011/0238514 A1 | 9/2011 | Ramalingam et al. |
| 2012/0001928 A1 | 1/2012 | Sheha et al. |
| 2012/0046019 A1 | 2/2012 | Rodkey, Jr. et al. |
| 2012/0100872 A1 | 4/2012 | Alizadeh-shabdiz et al. |
| 2012/0108265 A1 | 5/2012 | Morin |
| 2012/0130817 A1 | 5/2012 | Bousaleh et al. |
| 2012/0140749 A1 | 6/2012 | Caldwell et al. |
| 2012/0147862 A1 | 6/2012 | Poojary et al. |
| 2012/0161958 A1 | 6/2012 | Turon et al. |
| 2012/0172019 A1 | 7/2012 | Scott et al. |
| 2012/0235812 A1 | 9/2012 | Maia et al. |
| 2012/0242511 A1 | 9/2012 | Morgan et al. |
| 2012/0270521 A1 | 10/2012 | Lopez garcia et al. |
| 2012/0295639 A1 | 11/2012 | Fitoussi et al. |
| 2012/0307646 A1 | 12/2012 | Grosman et al. |
| 2012/0310527 A1 | 12/2012 | Yariv et al. |
| 2013/0005362 A1 | 1/2013 | Borghei |
| 2013/0006515 A1 | 1/2013 | Vellaikal et al. |
| 2013/0067044 A1 | 3/2013 | Levy-yurista et al. |
| 2013/0091452 A1 | 4/2013 | Sorden et al. |
| 2013/0103697 A1 | 4/2013 | Hill et al. |
| 2013/0155851 A1 | 6/2013 | Koodli et al. |
| 2013/0155965 A1 | 6/2013 | Koodli |
| 2013/0178233 A1 | 7/2013 | McCoy et al. |
| 2013/0179275 A1 | 7/2013 | Harb |
| 2013/0184009 A1 | 7/2013 | Attar et al. |
| 2013/0267253 A1 | 10/2013 | Case et al. |
| 2013/0290106 A1 | 10/2013 | Bradley et al. |
| 2013/0303195 A1 | 11/2013 | Bahl et al. |
| 2013/0316740 A1 | 11/2013 | Scarafia et al. |
| 2013/0345980 A1 | 12/2013 | van Os et al. |
| 2014/0019255 A1 | 1/2014 | Wu et al. |
| 2014/0143408 A1 | 5/2014 | Workman et al. |
| 2014/0256357 A1 | 9/2014 | Wang et al. |
| 2014/0257747 A1 | 9/2014 | Repenning et al. |
| 2015/0005012 A1 | 1/2015 | Wang et al. |
| 2015/0100271 A1 | 4/2015 | Wang et al. |
| 2015/0230053 A1 | 8/2015 | Scellato et al. |
| 2015/0264527 A1 | 9/2015 | Wang et al. |
| 2016/0249175 A1 | 8/2016 | Repenning et al. |
| 2017/0142550 A1 | 5/2017 | Wang et al. |
| 2018/0014155 A1 | 1/2018 | Wang et al. |
| 2018/0139584 A1 | 5/2018 | Wang et al. |
| 2018/0288573 A1 | 10/2018 | Repenning et al. |

FOREIGN PATENT DOCUMENTS

| | | |
|---|---|---|
| CN | 102413425 A | 4/2012 |
| CN | 102426022 A | 4/2012 |
| CN | 102902698 A | 1/2013 |
| CN | 103188310 A | 7/2013 |
| EP | 2 158 784 A2 | 3/2010 |
| JP | H10-56449 A | 2/1998 |
| JP | 11-328222 A | 11/1999 |
| JP | 2001-223712 A | 8/2001 |
| JP | 2001-256398 A | 9/2001 |
| JP | 2001-318845 A | 11/2001 |
| JP | 2002-015215 A | 1/2002 |
| JP | 2002-304562 A | 10/2002 |
| JP | 2003-006543 A | 1/2003 |
| JP | 2003-091678 A | 3/2003 |
| JP | 2003-115001 A | 4/2003 |
| JP | 2003-121171 A | 4/2003 |
| JP | 2003-203084 A | 7/2003 |
| JP | 2003-296625 A | 10/2003 |
| JP | 2004-078674 A | 3/2004 |
| JP | 2004-157499 A | 6/2004 |

(56) References Cited

FOREIGN PATENT DOCUMENTS

| | | |
|---|---|---|
| JP | 2004-272463 A | 9/2004 |
| JP | 2004-325215 A | 11/2004 |
| JP | 2006-010331 A | 1/2006 |
| JP | 2007-293823 A | 11/2007 |
| JP | 2008-519555 A | 6/2008 |
| JP | 2010-020802 A | 1/2010 |
| JP | 2011-023798 A | 2/2011 |
| JP | 2011-099859 A | 5/2011 |
| JP | 2012-102529 A | 5/2012 |
| JP | 2013-242642 A | 12/2013 |
| JP | 2014-063309 A | 4/2014 |
| JP | 2014-517943 A | 7/2014 |
| JP | 2014-519103 A | 8/2014 |
| KR | 1020120071957 A | 7/2012 |
| KR | 1020140015527 A | 2/2014 |
| WO | 2008134595 A1 | 11/2008 |
| WO | 2009075043 A1 | 6/2009 |
| WO | 2010080938 A2 | 7/2010 |
| WO | 2013106870 A1 | 7/2013 |
| WO | 2014138250 A1 | 9/2014 |
| WO | 2014210228 A1 | 12/2014 |
| WO | 2015123363 A1 | 8/2015 |

OTHER PUBLICATIONS

Atkinson, "Canada Office Action received for Canada Patent Application No. 2,939,368", dated Feb. 2, 2017, 3 pages.
Atkinson, "Canada Office Action received for Canada Patent Application No. 2939368", dated Jul. 4, 2018, 17 pages.
Bai, "International Preliminary Report on Patentability issued in International Application No. PCT/US2014/044202", dated Jan. 7, 2016, 6 pages.
Bai, "International Preliminary Report on Patentability issued in International Application No. PCT/US2015/015511", dated Aug. 25, 2016, 10 pages.
Becamel, "International Preliminary Report on Patentability issued in International Application No. PCT/US2014/020781", dated Sep. 17, 2015, 8 pages.
Cho, "Office Action issued in Australian Application No. 2013205204", dated Aug. 4, 2014, 4 pages.
Civan, "U.S. Office Action issued in copending U.S. Appl. No. 13/594,771, filed Aug. 24, 2012", dated Jan. 7, 2013, 10 pages.
Cosme, "U.S. Office Action issued in copending U.S. Appl. No. 14/179,209, filed Feb. 12, 2014", dated Nov. 24, 2015, 28 pages.
Cosme, "U.S. Office Action issued in copending U.S. Appl. No. 14/179,209, filed Feb. 12, 2014", dated May 11, 2016, 31 pages.
Cosme, "U.S. Office Action issued in copending U.S. Appl. No. 14/179,209, filed Feb. 12, 2014", dated Sep. 6, 2016, 33 pages.
Cosme, "U.S. Office Action issued in copending U.S. Appl. No. 14/179,209, filed Feb. 12, 2014", dated Mar. 17, 2017, 35 pages.
Cosme, "U.S. Office Action issued in copending U.S. Appl. No. 14/179,209, filed Feb. 12, 2014", dated Sep. 7, 2017, 29 pages.
Cranley, "European Office Action issued in European Application No. 14817048.3", dated Sep. 19, 2017, 10 pages.
Cranley, "Extended European Search Report issued in European Application No. 14817048.3", dated Dec. 19, 2016, 11 pages.
Ip.com, "Time-Limited Coupons and Tickets for Wearable Display, with Peer-to-Peer Replication", Jun. 17, 2014, 5 pages.
Jeong, "Office Action issued in Korean Application No. 10-2014-7023023", dated Jun. 22, 2015, 6 pages of English Translation and 6 pages of Korean Office Action.
Ji, "International Search Report and Written Opinion issued in International Application No. PCT/US2014/020781", dated Jun. 27, 2014, 11 pages.
Khan, "U.S. Office Action issued in copending U.S. Appl. No. 13/369,182, filed Feb. 8, 2012", dated Sep. 9, 2014, 11 pages.
Kihou, "Japanese Office Action issued in Japanese Application No. 2015-563130", dated Aug. 29, 2016, 3 pages of English Translation and 2 pages of Japanese Office Action.
Ko, "International Search Report and Written Opinion issued in International Application No. PCT/US2014/044202", dated Sep. 30, 2014, 9 pages.
Kolmel, et al., "Real Life Scenarios of Location Based Advertising", Jan. 1, 2003, 9 pages.
Kumondai, "Japanese Office Action issued in Japanese Application No. 2016-551248", dated Sep. 15, 2017, 04 pages of English Translation and 06 pages of Japanese Office Action.
Lau, "U.S. Office Action issued in copending U.S. Appl. No. 13/842,088, filed Mar. 15, 2013", dated Dec. 6, 2013, 11 pages.
Lau, "U.S. Office Action issued in copending U.S. Appl. No. 13/842,088, filed Mar. 15, 2013", dated Mar. 19, 2014, 6 pages.
Lau, "U.S. Office Action issued in copending U.S. Appl. No. 14/572,755, filed Dec. 16, 2014", dated Sep. 13, 2016, 15 pages.
Lau, "U.S. Office Action issued in copending U.S. Appl. No. 14/572,755, filed Dec. 16, 2014", dated Mar. 2, 2017, 17 pages.
Lau, "U.S. Office Action issued in copending U.S. Appl. No. 14/572,755, filed Dec. 16, 2014", dated Apr. 12, 2016, 8 pages.
Lau, "U.S. Office Action issued in copending U.S. Appl. No. 14/572,755, filed Dec. 16, 2014", dated Jun. 19, 2017, 11 pages.
Lee, "International Search Report and Written Opinion issued in International Application No. PCT/US2013/021594", dated Apr. 1, 2013, 11 pages.
Li, "Chinese Office Action issued in Chinese Application No. 201480023923.7", dated Mar. 21, 2017, 25 pages of English Translation and 14 pages of Chinese Office Action.
Luo, "Chinese Office Action issued in Chinese Application No. 201580008619.X ", dated Aug. 3, 2017, 17 pages of English Translation and 12 pages of Chinese Office Action.
Maslin, "International Search Report and Written Opinion issued in International Application No. PCT/US2015/015511", dated May 28, 2015, 11 pages.
Moon, "International Preliminary Report on Patentability issued in International Application No. PCT/US2013/021594", dated Jul. 24, 2014, 8 pages.
Nyugen, "U.S. Office Action issued in copending U.S. Appl. No. 13/786,416, filed Mar. 5, 2013", dated Jun. 18, 2013, 15 pages.
Oz, "Management Information Systems", Sixth Edition, Cengage Course Technology, 2009, 36 pages.
Raymond, "U.S. Office Action issued in copending U.S. Appl. No. 13/786,434, filed Mar. 5, 2013", dated Aug. 27, 2015, 8 pages.
Raymond, "U.S. Office Action issued in copending U.S. Appl. No. 15/142,897, filed Apr. 29, 2016", dated Aug. 24, 2017, 9 pages.
Seong, "Korean Office Action issued in Korean Application No. 10-2016-7023937", dated Jun. 9, 2017, 10 pages of English Translation and 8 pages of Korean Office Action.
Seong, "Korean Office Action issued in Korean Application No. 10-2018-7004997", dated Apr. 10, 2018, 3 pages of English Translation and 3 pages of Korean Office Action.
Seong, "Korean Office Action issued in Korean Application No. 10-2016-7002538", dated Mar. 2, 2016, 4 pages of English Translation and 3 pages of Korean Office Action.
Simon, "Australian Office Action issued in Australian Application No. 2015217150", dated Sep. 14, 2017, 4 pages.
Simon, "Office Action issued in Australian Application No. 2015217150", dated Mar. 14, 2017, 3 pages.
Sivji, "U.S. Office Action issued in copending U.S. Appl. No. 13/931,751, filed Jun. 28, 2013", dated Sep. 16, 2013, 22 pages.
Sivji, "U.S. Office Action issued in copending U.S. Appl. No. 13/950,511, filed Jul. 25, 2013", dated Nov. 21, 2013, 18 pages.
Sivji, "U.S. Office Action issued in copending U.S. Appl. No. 14/329,812, filed Jul. 11, 2014", dated Sep. 15, 2014, 17 pages.
Sivji, "U.S. Office Action issued in copending U.S. Appl. No. 14/727,795, filed Jun. 1, 2015", dated Mar. 15, 2016, 15 pages.
Sivji, "U.S. Office Action issued in copending U.S. Appl.n No. 14/727,795, filed Jun. 1, 2015", dated Oct. 26, 2015, 20 pages.
Sivji, "U.S. Office Action issued in copending U.S. Appl. No. 15/420,676, filed on Jan. 31, 2017", dated Feb. 27, 2017, 25 pages.
Zhou, "Chinese Office Action issued in Chinese Application No. 201480046073.2", dated Aug. 25, 2016, 8 pages of English Translation and 6 pages of Chinese Office Action.
Sivji, "U.S. Office Action issued in copending U.S. Appl. No. 15/710,351, filed Sep. 20, 2017", dated Mar. 12, 2018, 23 pages.

(56) References Cited

OTHER PUBLICATIONS

Spilling, et al., "Performance Enhancement in Cellular Networks with Dynamic Cell Sizing", The 11th IEEE International Symposium on Volume:2, 2000, pp. 1589-1593.
Stikeman, "Biometrics", Technology Review, vol. 104, No. 1, Jan. 1, 2001, 3 pages.
Watanabe, "Japanese Office Action issued in Japanese Application No. 2017-011007", dated Feb. 5, 2018, 7 pages of English Translation and 6 pages of Japanese Office Action.
Wuilleme, "European Office Action issued in European Application No. 14760121.5", dated Jan. 30, 2018, 9 pages.
Wuilleme, "Extended European Search Report issued in European Application No. 14760121.5", dated Mar. 27, 2017, 19 pages.
Wuilleme, "Supplementry European Search Report issued in European Application No. 14760121.5", dated Nov. 11, 2016, 6 pages.
Zhou, "Chinese Office Action issued in Chinese Application No. 201480046073.2", dated Feb. 13, 2017, 3 pages of English Translation and 3 pages of Chinese Office Action.
Cranley "Extended European Search Report issued in European Application No. 18198644.9", dated Nov. 9, 2018, 12 pages.
Cranley "Extended European Search Report issued in European Application No. 18198649.8", dated Nov. 9, 2018, 10 pages.
U.S. Appl. No. 13/786,434 to Repenning et al. filed Mar. 5, 2013.
U.S. Appl. No. 15/142,897 to Repenning et al. filed Apr. 29, 2016.
U.S. Appl. No. 15/946,421 to Repenning et al. filed Apr. 5, 2018.
U.S. Appl. No. 13/842,088 to Wang et al. filed Mar. 15, 2013.
U.S. Appl. No. 14/572,755 to Wang et al. filed Dec. 16, 2014.
U.S. Appl. No. 15/867,883 to Wang et al. filed Jan. 11, 2018.
U.S. Appl. No. 13/931,751 to Wang et al. filed Jun. 28, 2013.
U.S. Appl. No. 13/950,511 to Wang et al. filed Jul. 25, 2013.
U.S. Appl. No. 14/329,812 to Wang et al. filed Jul. 11, 2014.
U.S. Appl. No. 14/727,795 to Wang et al. filed Jun. 1, 2015.
U.S. Appl. No. 15/420,676 to Wang et al. filed Jan. 31, 2017.
U.S. Appl. No. 15/710,351 to Wang et al. filed Sep. 20, 2017.
U.S. Appl. No. 14/179,209 to Scellato et al. filed Feb. 12, 2014.
Hirsch "European Office Action issued in European Application No. 15706622.6", dated Jun. 11, 2019, 9 pages.
"Chinese Office Action issued in Chinese Application No. 201810174990.9", dated Mar. 5, 2019, 05 pages of English Translation and 05 pages of Chinese Office Action.
Yasui "Japanese Office Action issued in Japanese Application No. 2018-61959", dated Mar. 11, 2019, 06 pages of English Translation and 05 pages of Japanese Office Action.
Wuilleme "Extended European Search Report issued in European Application No. 19160555.9", dated May 22, 2019, 9 pages.
Seong "Korean Office Action issued in Korean Application No. 10-2016-7024405" dated Jul. 3, 2019, 3 pages of English Translation and 3 pages of Korean Office Action.
Atkinson "Canada Office Action received for Canada Patent Application No. 2,939,368" dated Jul. 4, 2019, 7 pages.
"Australian Office Action issued in Australian Application No. 2018203063" dated Aug. 22, 2019, 3 pages.

ENERGY-EFFICIENT LOCATION DETERMINATION

CROSS REFERENCE TO RELATED APPLICATION

This application is a continuation of and claims priority to U.S. patent application Ser. No. 14/179,209 filed Feb. 12, 2014, and entitled "Energy-Efficient Location Determination." The complete disclosure of the above-identified priority application is hereby fully incorporated herein by reference.

TECHNICAL FIELD

The present disclosure relates generally to location determination, and more particularly to determining the location of user device at a point of interest in an energy efficient manner.

BACKGROUND

Location data from a mobile device can be used for numerous applications. Many applications, for example, use location data for locating friends, playing games, and assisting a user with directions. The location data can also be used to provide an alert on a user's mobile device when the user is the vicinity of a point of interest, such as a business, an institution, landmark, park, or other location that would be of interest to a user. For example, a user may choose to be alerted every time the user is near a particular store or restaurant, especially if the alert includes a promotional offer for the store or restaurant of interest.

While location data can be used for a variety of applications, efficiently obtaining location data from a user device can be challenging—especially when accurate location information is needed. Conventionally, to obtain location information for nearby locations, the user device periodically scans its environment for available wireless signals every few minutes. The user device then communicates the location data to a location-based service, for example, which then determines the location of the user device by recognizing the available wireless signals.

Such periodic scanning for wireless signals, however, drains the battery life of the user device, as does the communication of the location data to the location-based service. The periodic scanning for available wireless signals is particularly wasteful of battery life, for example, when the user device is not near a point of interest. For example, a user may be carrying the user device while hiking in a wilderness remote area. Nevertheless, the user device may continue its periodic scanning for available wireless signals (even though none exist in the area).

SUMMARY

In certain example aspects described herein, a computer-implemented method for determining the location of a user device is provided. A location management system, for example, determines at a first time that a user computing device is outside a geofence boundary encompassing a particular point of interest. The location management system thus does not invoke a wireless signal detection module associated with the user device to determine wireless signals available to the user device. At a second that is subsequent to the first time, however, the location management system determines that the user computing device is inside the geofence boundary encompassing the particular point of interest.

In response to determining at the second time that the user computing device is inside the geofence boundary encompassing the particular point of interest, the location management system communicates instructions to the user computing device to invoke the wireless signal detection module associated with user computing device. The location management system then receives wireless signal data for a particular wireless signal that is available to the user computing device. Based on the received wireless signal data, the location management system determines that the particular wireless signal available to the user computing device is associated with the particular point of interest. The location management system thus determines—in response to determining that the particular wireless signal is associated with the particular point of interest—that the user computing device is at the particular point of interest.

In certain other example aspects, a system for location determination is provided herein. Also provided in certain aspects is a computer program product for location determination.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
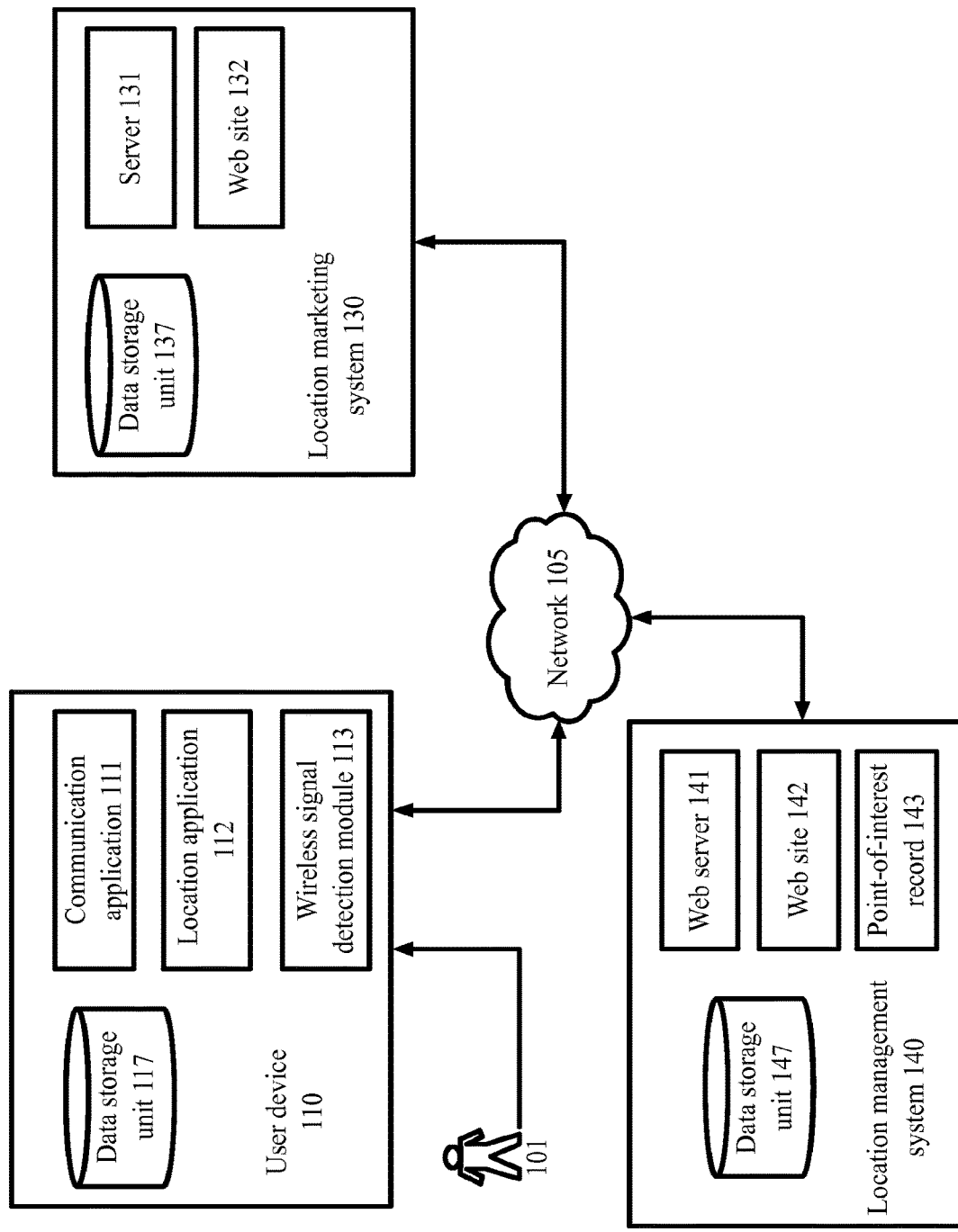
FIG. 1 is a block diagram depicting a system for energy-efficient location determination, in accordance with certain example embodiments.

As disclosed herein, a location management system identifies points of interest that may be of interest to one or more users. The location management system then defines a geofence boundary encompassing a particular point of interest. In certain examples, the location management system may define the geofence boundary encompassing the point of interest in response to determining that a particular user device is near the point of interest. The location management system may then first determine that the user device is not at or within the geofence boundary. But when the location management system thereafter determines that the user device is at or within the geofence boundary, the location management system instructs the user device to determine wireless signals available to the user device. The location management system then receives wireless signal data from the user device for available wireless signals. By matching the received wireless signal data to known wireless signals available at the identified points of interest, the location management system determines that the user device (and hence the user) is at the point of interest.

More particularly, the location management system obtains location data for multiple points of interest. For example, the location management system may determine location information for various points of interest that may be of interest to one or more users. In certain examples, a location marketing system may provide the location management system with location information, such as for various merchant storefronts that may be of interest to the user. The location information can be any information that establishes the location of a point of interest, such as a street address, Ordnance Survey Grid Reference information, and/or latitude and longitude coordinates for points of interest. The location information may also include content regarding the location, such as an indication of the wireless signals available at the point of interest. For example, the location information may include a media access control (MAC) address for a wireless access point (WAP) associated with a particular point of interest. The location management system may then store the location information—along any wireless signal information for the point of interest—in a point-of-interest record for each identified point of interest.

After obtaining location information for various points of interest, the location management system determines geofence boundaries associated with the points of interest. For example, the location management system may receive geofence boundary data from a marketing system associated with a point of interest. Additionally or alternatively, the location management system may define geofence boundaries for one or more points of interest. For example, if the location management system determines that a particular user device is near point of interest, the location management system may define a geofence boundary that encompasses the point of interest. The location management system may then, in certain examples, communicate the geofence boundary data to the user device that is near the point of interest.

Once the location management system determines a geofence boundary for a particular point of interest, the location management system determines the location of one or more user devices relative to the geofence boundary. That is, the location management system determines if a particular user device is at or outside the geofence boundary. Based on the location of the user device, the location management system instructs the user device to determine local wireless signals that are available to the user device. The wireless signals may include any type of non-wired signal available to the user device, such as a Wi-Fi wireless local area network (WLAN) signal, Bluetooth signal, near field communication (NFC) signal, or other signals.

If the location management system determines that the user device is outside the geofence boundary, the location management system does not instruct the user device to determine wireless signals available to the user device. That is, if user device has not entered the geofence boundary, the location management system determines, for example, that that user device is not close enough to the point of interest to accurately determine available wireless signals from the point of interest. Hence, the location management system does not instruct the user device to search for wireless signals, which in turn reduces power consumption by the user device as described herein. The wireless signals may include any type of signal available to the user device, such as a Wi-Fi wireless local area network (WLAN) signal, Bluetooth signal, near field communication (NFC) signal, or other signals.

Conversely, if the geofence management system determines that the user device is within the geofence boundary, the location management system provides instructions to the user device to determine local wireless signals that are available to the user device. That is, the location management system determines that—because the user device is inside the geofence boundary—the user device is close enough to the point of interest to accurately determine available wireless signals. Hence, the location management system instructs the user device to determine local wireless signals that are available to the user device when the user device is inside the geofence boundary. The user device then determines wireless signal data for wireless signals available to the user device. For example, by activating a wireless signal detection module associated with the user device, the user device may determine a media access control (MAC) address for a wireless access point (WAP) that is available to the user device. The user device communicates the wireless signal data to the location management system, and the location management system receives the wireless signal data.

After receiving the wireless signal data, the location management system reads the wireless signal data to determine the wireless signals available to the user device. The location management system then compares the available wireless signals with the record of wireless signals associated with the point-of-interest record. If the location management system identifies a match for an available wireless signal in the record—such as a matching media access control (MAC) address—the location management system determines that the available wireless signal is associated with the corresponding point of interest in the record. Hence, because the user device is close enough to the point of interest to determine that the wireless signal associated with the point of interest is available to the user device, the location management system determines that the user device is at the particular point of interest.

By instructing the user device to determine available wireless signals after determining that the user device is at or inside a geofence boundary, the methods and systems described herein reduce battery consumption of the device. That is, the methods and systems described herein shift the timing of when a user device primarily determines wireless signals available to the device to when the user device is actually close to the point of interest. Hence, by employing the methods and systems described herein, a user device does not waste energy (and unnecessarily consume battery power) by attempting to determine available wireless signals when the user device is outside a geofence boundary for a point of interest (and thus not near the point of interest).

Example System Architectures

Turning now to the drawings, in which like numerals indicate like (but not necessarily identical) elements throughout the figures, example embodiments are described in detail.

FIG. 1 is a block diagram depicting a system 100 for energy-efficient location determination, in accordance with certain example embodiments.

As depicted in FIG. 1, the exemplary operating environment 100 includes a user network computing device 110, a location marketing computing system 130, and a location management computing system 140. In another example embodiment, two or more of these systems (including systems 110, 130, and 140) or parts thereof are integrated into the same system. In certain example embodiments, a user 101 associated with a user device 110 must install an application and/or make a feature selection on the user device 110 to obtain the benefits of the methods and techniques described herein.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a storage area network (SAN), a personal area network (PAN), a metropolitan area network (MAN), a wireless local area network (WLAN), a virtual private network (VPN), a cellular or other mobile communication network, Bluetooth, near field communication (NFC), or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 105. For example, each network device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, and 140 are operated by end-users or consumers, location marketing system operators, and location management system 140 operators.

The user 101 can employ a communication application 111, such as a web browser application 114 or a stand-alone application, to view, download, upload, or otherwise access documents or web pages via a distributed network 105. The communication application 111 of the user computing device 110 can interact with web servers or other computing devices connected to the network 105. For example, the communication application 111 can interact with the user network computing device 110, the location marketing system 130, and/or the location management system 140. The communication application 111 may also comprise a web browser (not shown), which provides a user interface, for example, for accessing other devices associated with the network 105.

The user device 110 includes, for example, a location application 112 that is configured to interact and communicate with the location management system 140 and/or the location marketing system 130 via the communication application 111 and the network 105. For example, the location application 112 can be used and configured to receive and send device location data to the location management system 140 and the location marketing system 130. As used herein, "location data" can include any data processed in an electronic communications network or by an electronic communications service that indicates the geographical position of the user device 110. For example, the location data may include latitude and longitude for the user device 110 or a location of a point of interest.

The location application 112 may also be configured to communicate and interact with a location-based service provider (not shown) that, in conjunction with the user device 110, facilitates determination of the location of the user device 110. For example, the location application 112 may, along with a location-based service, rely on Wi-Fi signals and cellular communication towers to determine the location of the user device 110. Additionally or alternatively, the location application 112 may rely on satellites, Global Positioning System ("GPS") location technology, a Network Location Provider ("NLP"), a map application, or other location identifying technology of the user device 110 to determine location data for the user device 110. Additionally or alternatively, the location application 112 may rely on enhanced GPS systems and methods, such as those associated with a Differential Global Positioning System ("DGPS"). In certain example embodiments, the location application 112 may be configured to send and receive alert content from the location management system 120 and/or the location marketing system 130. For example, location application 112 may be configured to receive content regarding coupons, specials offers, or other items related to the marketing efforts of the location marketing system 130. The location application 112 may also be configured to receive content unrelated to marketing efforts, such as names of parks or other geographic landmarks that may be of interest to a user 101.

The user device 110 also includes a wireless signal detection module 113 that operates to detect and identify local wireless signals present in the environment of the user device 110 and hence available to the user device 110. For example, the wireless signal detection module 113 may detect wireless signal data from a metropolitan area network (MAN), a wireless local area network (WLAN) signal, a Bluetooth device or signal, and/or a near field communication (NFC) device or signal. The wireless signal detection module 113 may also be configured to determine, for example, a media access control (MAC) address or other identifier that is unique to the network interfaces of the identified wireless signals. The wireless signal detection module 113 may also be configured, for example, to communicate identified wireless signal data to other devices on the network 105, such as the location management system 140. For example, the wireless signal detection module 113 may communicate wireless signal data to the location management system 140 either directly or via the communication application 111.

The user device 110 includes a data storage unit 117 that is accessible by the communication application 111, location application 112, and the wireless signal detection module 113. In certain embodiments, for example, the data storage unit 117 may store data regarding the location of the device, such as Wi-Fi hotspots or cellular communication towers that are or have been available to the user device 110. The data storage unit 117 of the user device 110 can also store content related to the location data, such as name of the location. The exemplary data storage unit 117 can include one or more tangible computer-readable media. The data storage unit 117 can be stored on the user device 110 or can be logically coupled to the user device 110. For example, the data storage unit 117 can include on-board flash memory and/or one or more removable memory cards or removable flash memory.

The location marketing system 130 represents a system that provides location data for points of interest to the location management system 140. The location marketing system 130 includes a location-marketing server 131 and associated web site 132. The location marketing system server 131, for example, represents the computer-implemented system that the location marketing system 130 employs to provide point-of-interest location data to the location management system 140. For example, the server 131 of the location marketing system 130 may determine physical locations of various merchants that may be of interest to one or more users 101. The server 131 of the location marketing system 130 may also determine additional content information regarding the points of interest, such as the name of the points of interest and local wireless signals that are available at the points of interest.

In certain example embodiments, the location marketing system 130 may represent any number of systems that location management system 140 may use to obtain point-of-interest location data and content information for each point of interest. For example, the location marketing system 130 may be the marketing system of a product manufacturer or a service provider. The location marketing system 130 may be a social network system of a user 101 that can provide preferences and historical data of a user's activities. The location marketing system 130 may be a coupon aggregator or provider for various merchants. The location marketing system 130 may also be a mapping program. The location marketing system 130 may be any other service or system that may provide location data and content information that the location management system 140 can use to define the location of a point of interest and to obtain content information for the point of interest. In certain example embodiments, the location marketing system 130 may determine geofence boundaries that encompass one or more points of interest associated with the location marketing system.

In certain example embodiments, the location marketing system 130 may include a data storage unit 137 accessible by the server 131 of the location marketing system 130. The data storage unit 137 can include one or more tangible computer-readable storage devices. The data storage unit 137 can be stored on the location marketing system 130 or can be logically coupled to location marketing system 130. For example, the data storage unit 134 can include on-board flash memory and/or one or more removable memory cards or removable flash memory. In certain example embodiments, the location marketing system 130 may store point of interest location data and associated content information for each point of interest on the data storage unit 137.

The location management system 140 represents, for example, a system for identifying points of interest, determining geofence boundaries for the points of interest, determining when a user device enters the geofence boundary, and instructing a user device 110 to determine wireless signals available to the user device as described herein. Based on the available wireless signals, the location management system 140 may also determine the location of the user device 110.

The location management computing system 140 comprises a web sever 141 and associated web site 142. The web server 121, for example, may represent the computer-implemented system that the location management computing system 140 employs to manage geofences on behalf of a user 101. In certain example embodiments, a user 101 may access the website 142 of the location management computing system 140 to associate points of interest with the location management computing system 140. The location management computing system 140, such as through the web server 141, can also be used and configured to receive point-of-interest location data from the location marketing system 130 via the network 105, a merchant system (not shown), or any other system that provides location data for points of interest. The location management computing system 140 can likewise be used and configured to receive and store content information regarding the points of interest. In certain embodiments, the location management computing system 140 comprises a web-crawler (not shown), for example, that obtains and indexes location data for points of interest that may be of interest to users generally or to a particular user 101.

The location management computing system 140 may include an accessible data storage unit 147. In certain example embodiments, the data storage unit 147 stores location data for the user device, such as cellular communication towers and Wi-Fi signals that are or have been available to the user device 110. The data storage unit 137 may also store point-of-interest location information and content information received from the location marketing system 130, for example. The exemplary data storage unit 147 can include one or more tangible computer-readable media. The data storage unit 147 can be stored on the user device 110 or can be logically coupled to the user device 110. For example, the data storage unit 147 can include on-board flash memory and/or one or more removable memory cards or removable flash memory. In certain example embodiments, a record for points of interest—such as a point-of-interest record 143 that includes location and content data for one or more points of interest—may be associated with the data storage unit 147.

In certain example embodiments, the location management functions of the location management system 140 may execute and operate independently of the location application 112. Additionally or alternatively, the location management functions of the location management system 140 may execute completely or partially within or as part of the location application 112, or as a companion application to the location application 112 on the user device 110. In certain example embodiments, the location management system 140 may use a location provider (not shown) that determines the location of the user device 110 based on, for example, location data received from the location application 112. The location provider may rely on Wi-Fi signals, cellular communication data, satellites, a Global Positioning System ("GPS") location technology, a Network Location Provider ("NLP"), a map application, or other location identifying technology of the user device 110 to determine the user device location.

It will be appreciated that the network connections shown in FIG. 1 are exemplary and that other means of establishing a communications link between the computers and devices can be used. Additionally, those having ordinary skill in the art having the benefit of the present disclosure will appreciate that the user device 110, the location management system 140, and the location marketing system 130 illustrated in FIG. 1 can have any of several other suitable computer system configurations. For example, a user device 110 embodied as a mobile phone or handheld computer may or may not include all the components described herein.

Example Processes

The components of the example operating environment 100 are described hereinafter with reference to the example methods illustrated in FIGS. 2-4.

Figure 2:
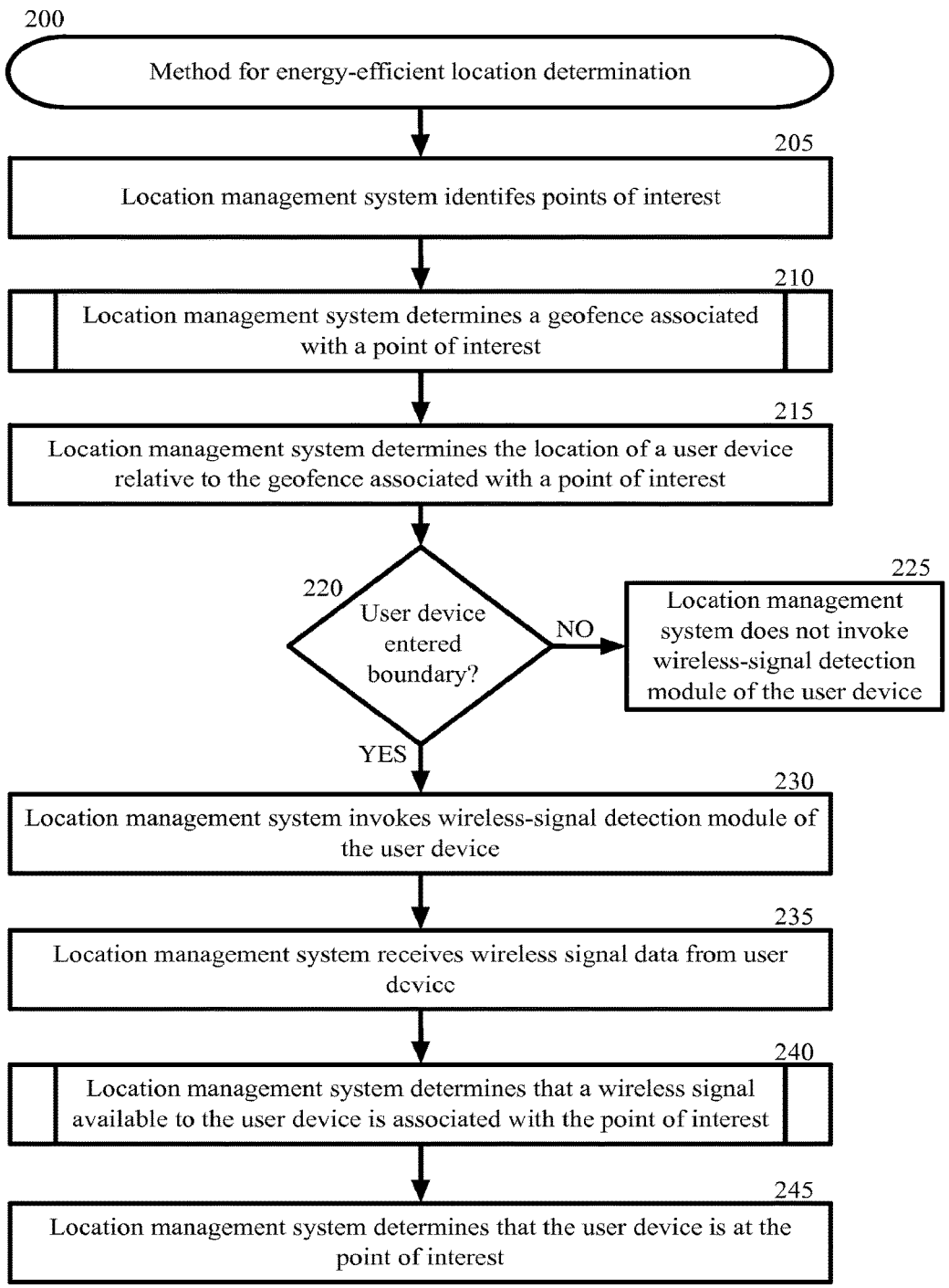
FIG. 2 is a block flow diagram depicting a method for energy-efficient location determination, in accordance with certain example embodiments.

FIG. 2 is a block flow diagram depicting a method for or energy-efficient location determination, in accordance with certain example embodiments.

With reference to FIGS. 1 and 2, in block 205, the location management system 140 identifies points of interest. That is, the location management system 140 obtains and stores location information for multiple, geographical locations that might be of interest to a broad range of different users 101. For example, the locations may comprise specific merchant storefronts, retailers, restaurants, landmarks, buildings, parks, rail stations, airports, ports, sports arenas, or any other location that might be of interest to one or more users 101. The location information for the points of interest may include any information that defines the physical location of a point of interest. For example, the location information may include the latitude and longitude coordinates of each point of interest. Additionally or alternatively, the location information may include the street address for each point of interest or the Ordnance Survey Grid Reference information for the point of interest. In certain example embodiments, the location management system 140 may convert street address location data to latitude and longitude coordinates for the points of interest.

The location management system 140 may also determine information about the points of interest, such as content information associated with a particular point of interest. For example, the content information may include the name of the point of interest, such as the name of a merchant storefront. Additionally or alternatively, the content information for a point of interest may include information for local wireless signals that are available at the point of interest. That is, the location management system 140 may determine Wi-Fi signals, Bluetooth signals, near field communication (NFC) signals, or other wireless signals that are available to a user device 110 at the geographic location of the point of interest. For example, the location management system 140 may obtain a media access control (MAC) address for a Wi-Fi signal available at a particular point of interest.

The location management system 140 can obtain location information—and associated location content information—for each point of interest from any source. For example, the location marketing system 130 may provide the location management system 140 with location information and associated content for points of interest related to the marketing efforts of the location marketing system 130. Additionally or alternatively, merchants can provide the location management system 140 with location information and associated content for merchant storefronts of the merchant. For example, merchants may provide the location management system 140 with location data for point-of-sale terminals associated with the merchant. Additionally or alternatively, a location-based service provider (not shown), for example, may provide location information for various points of interest to the location management system 140.

In certain example embodiments, the location management system 140 may gather point-of-interest location information and associated content. For example, the location management system 140 may rely on a web crawler (not shown) to obtain location data (and content information) for points of interest, such as by accessing websites for various points of interest. Additionally or alternatively, a user 101 may identify points of interest for the location management system 140. For example, a user 101 may, such as through a web site 142 of the location management system 140, provide names of points of interest to the location management system 140. The user 101 may also enable the user device 110 to provide available wireless signal information to the location management system 140, such as when a user 101 is at or near a particular point of interest. The location management system 140 then determines the location for the points of interest for the user-provided information, along with any content pertinent to the points of interest, such as wireless signals available at the location.

In certain example embodiments, the location management system 140 may rely on the user history of the user 101 to identify points of interest for a particular a user 101. The user history can include, for example, the user's social network content, user content, purchase history, search history, or any other items related to the user's online activities. For example, if a user 101 frequently purchases electronics, the location management system 140 may obtain location data for electronics stores—as points of interest—on behalf of the user 101. If a user 101 frequents a coffee shop, the location management system 140 may determine location information—and associated content information such as available wireless signals—for the coffee shop.

Once the location management system 140 obtains location information and associated content information for multiple points of interest, the location management system 140 can strip the location information and associated content of any user-identifying information. Hence, the location management system 140 obtains only data showing the location of a point of interest and content for the point of interest. For example, the location management system 140 may strip from the location information and associated content any information placing a particular user device 110 at a particular location at a particular time.

The location management system 140 may then store the stripped location information for points of interest—along with the stripped content associated with each point of interest—in an accessible database. For example, the location management system 140 may store the location coordinates for a particular point of interest—along with a record of local wireless signals available at the location—in a point-of-interest record 143 associated with the location management system 140. The location management system 140 can then later assess the point-of-interest record 143, for example, so that the location management system 140 can later retrieve the location information for a point of interest (and the content associated with the point) from the point-of-interest record 143.

In block 210, the location management system 140 determines a geofence associated with a point of interest. In certain example embodiments, the location management system 140 may receive geofence boundary data from a location marketing service 130. That is, when providing location information to the location management system 140 for a point of interest, the location marketing service 130 may provide geofence boundary data to the location management system 140 for a geofence encompassing the point of interest. Additionally or alternatively, after identifying a particular point of interest, the location management system 140 may determine geofence data for a geofence boundary encompassing the particular point of interest. For example, an operator of the location management system 140 may configure the geofence boundary to be a certain radius from the point of interest. In certain example embodiments, after determining geofence boundary data for a point of interest, the location management system 140 communicates the geofence boundary information to the user device 110.

In certain example embodiments, the location management system 140 may determine a geofence boundary encompassing a point of interest in response to the user device being near the point of interest. For example, the location management system 140 may determine the location of a user device 110 of a user 101. Based on the location of the user device 110, the location management system 140 may determine points of interest that are in the proximity of the user device 110. The location management system 140 then defines a geofence boundary around one or more the points of interest that are in the proximity of the user device 110. The details of such an embodiment, as provided in block 210, are described in further detail below with reference to FIG. 3.

Figure 3:
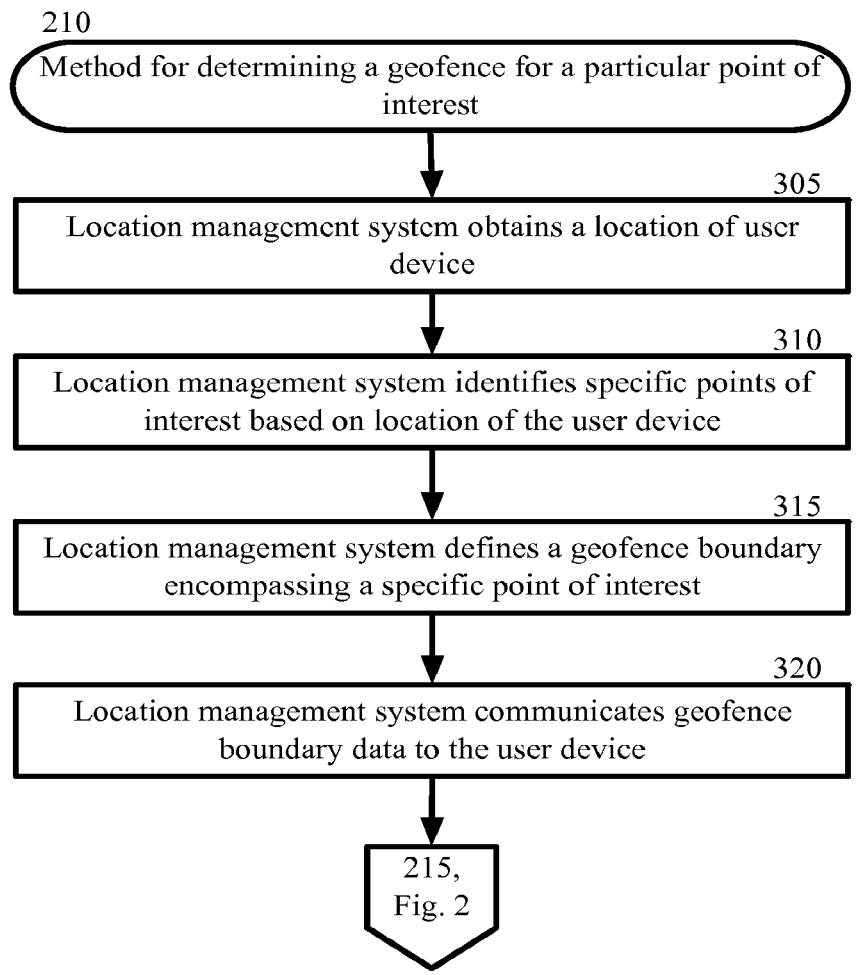
FIG. 3 is a block flow diagram depicting a method for determining a geofence for a particular point of interest, in accordance with certain example embodiments.

FIG. 3 is a block flow diagram depicting a method 210 for determining a geofence for a specific point-of-interest, in accordance with certain example embodiments, as referenced in block 210 of FIG. 2.

With reference to FIGS. 1 and 2, in block 305 of method 210, the location management system 140 obtains a location of a user device 110. That is, to manage geofence-based alerts for a particular user, the location management system 140, at the option of the user 101, receives and monitors the location of the user device 110, such as a mobile phone of the user 101. A location application 112 on the user device 110, for example, determines the location of the user device 110, such as the latitude and longitude coordinates of the user device 110. For example, the location application 112 coordinates with a location-based service to determine the location of the user device 110.

Additionally or alternatively, the location application 112 can rely on a global positioning system to determine the location of the user device 110. Additionally or alternatively, the location for the user device 110 may comprise any other suitable location data, such as the street address for the user device 110 or Ordnance Survey Grid Reference information for the user device 110. The location application 112, for example, communicates the location data to the location management system 140, and the geofence management system receives the location data. In certain example embodiments, the user 101 may have to provide or adjust a setting on the user device 110 in order for the location management system 140 to obtain the location of the user device 110. For example, the user 101 may have to provide or adjust a setting of the location application 112 so that the location application 112 can determine location information of the user device 110.

In certain example embodiments, the location management system 140 converts location data to latitude and longitude coordinates for the user device 110. In certain example embodiments, the location management system 140—and an associated location provider (not shown)—operate as a location-based service that, in conjunction with the location application 112 of the user device 110, determine and monitor the location of the user device 110 (based on user authorization to determine and monitor the location of the user device 110). For example, the determine and monitor the location of the user device 110 uses the location provider to determine and monitor the location of the user device 110 based on location data received from the location application 112 of the user device 110.

In certain example embodiments, an application on the user device 110, such as the location application 112, may periodically refresh the location data for the user device 110. For example, the location application 112 may, in association with a location-based service or global positioning system, determine the location of the user device 110 at configurable intervals. By refreshing the location data, location application 112 on the user device 110 obtains new location data when the device moves to a different location. In certain example embodiments, the location application 112 communicates the location data of the user device 110 to the location management system 140 when new location data is obtained. Additionally or alternatively, the location application 112 on the user device 110 may periodically communicates the location data to the location management system 140 at configurable intervals, regardless of whether new location data was obtained during the refresh. The location management system 140 then receives the location information for the user device 110.

In block 310, the location management system 140 identifies specific points of interest based on the location of the user device 110. That is, after determining the location of the user device 110, the location management system 140 relies on the location data for points of interest to identify points of interest that are near or nearby the determined location of the user device 110. For example, the location management system 140 accesses point-of-interest location data, such as from the point-of-interest record 143, to identify points of interest near the user device 110. Nearby points of interest, for example, can comprise any or all points of interest that are within a configurable distance or radius around the user device 110. For example, the location management system 140 may determine that the near or nearby points of interest are those that are within a 1, 2, 3, 4, 5, 6, 7, 8, 9, 10, 15, 20, 25, 30, 35, 40, 50, 70, 80, 100, or more kilometer radius of the user device 110.

To determine whether a particular point of interest falls within a configurable radius around the user device 110, for example, the location management system 140 can compare the received location data of the user device 110 with the location data for points of interest that location management system 140 has obtained. For example, the location management system 140 can compare the latitude and longitude coordinates of the user device 110 with the latitude and longitude coordinates for points of interest that location management system 140 maintains in the point-of-interest record 143. If the location data for a point of interest places the point of interest within the configurable radius around the user device, for example, the location management system 140 determines that the point of interest is near the user device 110 (and hence presumably the user).

In certain example embodiments, the location management system 140 may identify specific points of interests that the location management system 140 anticipates will be near the user device 110. That is, the location management system 140 may receive or obtain information indicating that the user device 110 will be near specific points of interest. For example, a user 101 may enter destination information into a mapping application (not shown) on the user device. Based on the current location of the user device and the location of the destination, the mapping application can determine a route for the user device 110. The location application 112, for example, may be configured to receive the planned route and destination information from the mapping application and then communicate the planned route and destination information to the location management system 140. The location management system 140 receives the planned route and intended destination information for the user device 110. The location management system 140 can then identify specific points of interest along the planned route and at the expected destination.

In block 315, the location management system 140 defines a geofence boundary encompassing a specific point of interest. That is, the location management system 140 determines geofence boundary data for a geofence, the boundary of which contains the point of interest. For example, the location management system 140 may define latitude and longitude coordinates that encompass the point of interest. Additionally or alternatively, the geofence boundary data encompassing the point of interest can be a predefined boundary, such as city or county line boundaries. In certain example embodiments, the geofence boundary may be a dynamic boundary. For example, if the user device 110 moves, the location management system 140 may define a new geofence boundary based on the movement of the user device 110.

In certain example embodiments, the geofence boundary data can comprise a location point and a defined, configurable radius around the location point. As a configurable radius, the radius around the location point can be any distance that the location management system 140 determines. For example, the configurable radius of the clustered geofence boundary around a mall may be 200 meters, such that a user device 110 in the mall parking lot, or a user device 110 entering the mall, would be inside the geofence boundary. Alternatively, the configurable radius may be larger. For example, the location management system 140 may define a geofence boundary radius of 5, 10, 15, 20, 25, 30, 35, 40, 50, 70, 80, 100, or more kilometers around a point of interest.

In certain example embodiments, the geofence boundary data may encompass the point of interest by establishing a geofence that does not rely on a radius, but rather a defined region or barrier between the point of interest and the user device 110. That is, the location management system 140 establishes a pass-through geofence barrier between the point of interest and the user device 110. For example, the location management system 140 may define a region that is five kilometers long and 200 meters wide and that lies between the point of interest and the user device 110, thus forming a five kilometer barrier line between the point of interest and the user device 110. When the user device 110 passes through the geofence barrier line, the location management system 140 determines that the user device 110 is inside the geofence boundary as described herein.

In block 320, location management system 140, in certain example embodiments, communicates the geofence boundary data to the user device 110. That is, after the location management system 140 determines geofence boundary data encompassing a specific point of interest, the location management system 140 transmits the geofence data to the user device 110. For example, the location management system 140 transmits latitude and longitude coordinates for the geofence boundary to the user device 110, such as via the network 105. The user device 110 receives the transmission, and then stores the geofence boundary data, such as in the cache of the user device 110 and/or on the data storage unit 114 of the user device 110. The user device 110 can then, for example, determine if the user device has entered the geofence boundary as described herein. Alternatively, in certain example embodiments that location management system 140 may, after determining the geofence boundary data, rely on received location data from the user device to determine the location of the user device 110 relative to the geofence boundary. That is, in certain example embodiments, the location management system 140 may not communicate the geofence boundary data to the user device 110, but instead determine—based on the location the user device 110—whether the user device is inside the geofence boundary.

Returning to FIG. 2, in block 215 of FIG. 2, the location management system 140 determines the location of a user device 110 relative to the geofence associated with a point of interest. That is, the location management system 140 determines whether the user device is at or inside the geofence boundary associated with the point of interest. For example, the location application 112 on the user device 110, such as the location application 112, may communicate location data for the user device 110 to the location management system 140. The location management system 140 then determines that the user device is at or within the geofence boundary. For example, the location application 112 may periodically communicate location data for the user device 110 to the location management system 140 at configurable intervals, such as at configurable location data refresh times.

Based on the location data received from the user device 110, the location management system 140 compares the location data of the user device 110 with the geofence boundary data. At a first time, for example, the location management system 140 may determine that the user device is not at or within a geofence boundary associated with a point of interest. At a subsequent second time, however, the location management system 140 may determine that the user device 110 is at or inside the geofence boundary. Hence, the location management system 140 determines that the user device 110 has entered the geofence boundary for the point of interest.

Additionally or alternatively, an application on the user device 110, such as the location application 112, monitors the location of the user device 110 relative to the geofence boundary. For example, the location application 112 may periodically refresh the device location data at configurable intervals. The location application 112 then compares the location data of the user device 110 with the geofence boundary data. If at a first time, for example, the location application 112 determines that the user device 110 is not at or within (inside) the geofence boundary, the location application 112 subsequently determines the location of the user device 110. If at a subsequent, second time the location application 112 determines that the user device 110 is at or within the geofence boundary, the location application 112 may, in certain example embodiments, communicate a notice of the geofence entrance event to the location management system 140. That is, the location application 112 informs the location management system 140 that the user device 110 is at or within the geofence boundary for the point of interest. Alternatively, in response to determining that the user device 110 is at or inside the geofence boundary, the location application 112 may invoke the wireless signal detection module 113 as described herein.

If the user device 110 has not entered the geofence boundary for a particular point of interest, the method follows the "NO" branch of block 220 to block 225, in accordance with certain example embodiments. If, however, the location management system 140 determines—or if an application of the user device 110 determines—that the user device has entered the geofence boundary associated with a particular point of interest, then the method follows the "YES" branch of block 220 to block 230, in accordance with certain example embodiments.

In block 225, the location management system 140 does not invoke a wireless signal detection module 113 of the user device 110. For example, if at a first time the location application 112 on the user device 110 determines that the user device 110 is not at or within the geofence boundary for a point of interest, the location application 112 does not inform the location management system 140 of an entrance event. Hence, the location management system 140, for example, does not instruct the user device 110 to invoke the wireless signal detection module 113 on the user device 110. Similarly, if based on received location data for the user device 110 the location management system 140 determines at a first time that the user device 110 is not at or within a geofence boundary, the location management system 140 does not invoke the wireless signal detection module 113 on the user device 110.

In block 230, based on determining that the user device 110 is at or within (inside) the geofence boundary, the location management system 140 invokes the wireless signal detection module 113 on the user device 110. That is, in response to determining that the user device 110 is at or within the geofence boundary, the location management system 140 activates the wireless signal detection module 113 on the user device 110. The wireless signal detection module 113 then determines wireless signals available to the user device 110 as described herein.

For example, at a first time, the location management system 140 may determine that the user device 110 has not entered the geofence boundary for a point if interest, and hence not activate the wireless signal detection module 113 as described herein. But at a subsequent, second time, for example, the location management system 140 may determine—based on received location data from the user device 110—that the user device 110 has entered the geofence boundary for the point of interest. Hence, in response to determining that the user device 110 is at or inside the geofence boundary for the point of interest, the location management system 140 invokes the wireless signal detection module 113 on the user device 110. In certain example embodiments, an application on the user device 110, such as the location application 112, may—in response to determining that the user device 110 has entered the geofence associated with the point of interest—invoke the wireless signal detection module 113.

By activating an otherwise inactive wireless signal detection module 113, for example—when the location management system 140 determines that the user device 110 is at or inside the geofence boundary for the point of interest—the location management system 140 reduces battery consumption of the user device 110 (compared to otherwise activating the wireless signal detection module 113 when the user device is outside the geofence boundary). In other words, the user device 110 does not waste energy scanning for a wireless signal when the user device 110 is not near the point of interest, as determined by the user device 110 being outside (not at or within) the geofence boundary for the point of interest.

In block 235, the location management system 140 receives wireless signal data from the user device 110. For example, as a consequence of invoking the wireless signal detection module 113 on a user device 110 as described in block 230, the wireless signal detection module 113 scans the local environment for available wireless signals. The wireless signals, for example, may include available Wi-Fi signals, Bluetooth signals, near field communication (NFC) signals, or other wireless signals that are available to a user device 110 at the geographic location of the point of interest. The user device 110, such as via the wireless signal detection module 113 and the communication application 111, then communicates wireless signal data for the available wireless signals to location management system 140 via the network 105. The location management system 140 then receives the wireless signal data via the network 105. The wireless signal data may include, for example, information that is unique to each of the available wireless signals. For example, a Wi-Fi signal for a particular point of interest may include a media access control (MAC) address for the Wi-Fi signal.

In block 240, the location management system 140 determines that a wireless signal available to the user device 110 is associated with the point of interest. For example, based on the received wireless data from the user device 110, the location management system 140 reads the wireless signal data to determine a match for the wireless signal, such as a match in the point-of-interest record 143. If the location management system 140 identifies a match, the location management system determines that the received wireless signal data corresponds to a wireless signal at the point of interest. The details of block 240 are described in further detail below with reference to FIG. 4.

Figure 4:
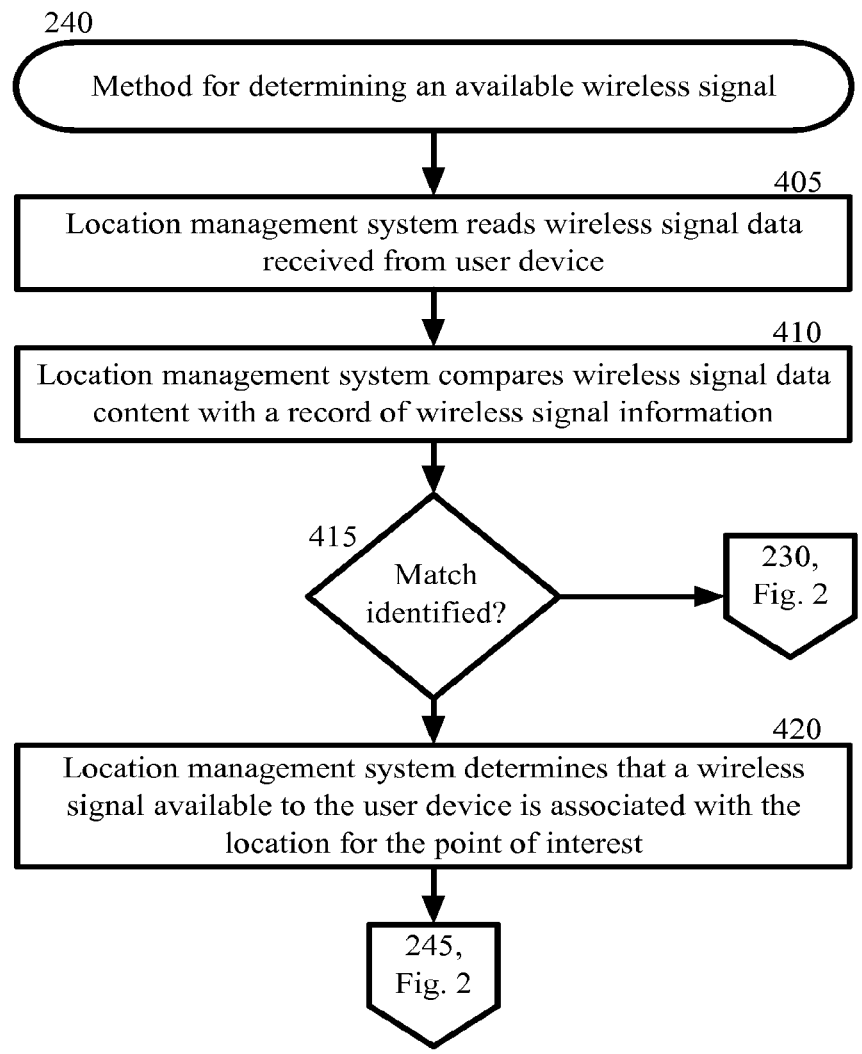
FIG. 4 is a block flow diagram depicting a method for determining an available wireless signal, in accordance with certain example embodiments.

FIG. 4 is a block flow diagram depicting a method 240 for determining an available wireless signal, in accordance with certain example embodiments, as referenced in block 240 of FIG. 2.

With reference to FIGS. 1 and 2, in block 405 of method 240, the location management system 140 reads wireless signal data received from user device 110. That is, the location management system 140 determines the content of the wireless signal data received from the user device 110. For example, if the wireless signal detection module 113 of the user device 110 detects a wireless Wi-Fi signal for a particular point of interest, the wireless signal data may include a media access control (MAC) address for a specific Wi-Fi wireless signal. The location management system 140 thus reads the received wireless data and determines—based on the content of the data—the media access control (MAC) address for the Wi-Fi signal of the point of interest.

In block 410, the location management system 140 compares the determined wireless signal data content with a record of wireless signal information. As described above in block 205, for example, the location management system 140 may receive wireless signal information for particular points of interest when identifying points of interest. For example, the location management system 140 may obtain a media access control (MAC) address for a Wi-Fi signal available at a particular point of interest. The location management system 140 may then store the wireless signal information in a record, such as the point-of-interest record 143. By comparing the content of the wireless signal data received from the user device 110 with the wireless signal information in the point-of-interest record 143, for example, the location management system 140 attempts to determine a match for the wireless signal content. For example, the location management system 140 may identify a media access control (MAC) address in the point-of-interest record 143 that matches a media access control (MAC) address received from in the wireless signal data from the user device 110.

If the location management system 140 identifies a match for the wireless signal data content, such as in the point-of-interest record 143, then the method follows the "YES" branch of block 415 to block 420, in accordance with certain example embodiments. If, however, the location management system 140 does not identify a match, the method follows the "NO" branch of block 415 back to block 230, in certain example embodiments. That is, if the location management system 140 does not identify a match, the location management system 140 may again invoke the wireless signal detection module 113 on the user device 110, such as in an attempt to obtain wireless signal data for which a match may exist.

In block 420, the location management system 140 determines that a wireless signal available to the user device 110 is associated with the location for the point of interest. That is, based on a match for the wireless signal data, such as a match in the point-of-interest record 143 for the point of interest, the location management system 140 determines that a wireless signal available to the user device 110 corresponds to a wireless signal available at the point of interest. Hence, the availability of the wireless signal to the user device 110 at the point of interest provides an indication, for example, that the user device 110 is at the point of interest.

For example, the location management system 140 may identify a specific coffee shop as a point of interest. In a point-of-interest record 143 for the coffee shop, the location management system 140 may identify, for example, the name and street address for the coffee show. The location management system 140 may also determine that a Wi-Fi signal at the coffee shop includes a media access control (MAC) address of "01-23-45-67-89-AB," which the location management system 140 includes in the point-of-interest record 143. After a user device 110 enters a geofence boundary for the coffee shop, the user device 110 may determine, such as via the wireless signal detection module 113, that a Wi-Fi signal available to the user device 110 includes a "01-23-45-67-89-AB" media access control (MAC) address. After communicating wireless signal data to the location management system 140 that includes the "01-23-45-67-89-AB" media access control (MAC) address, the location management system 140 identifies the corresponding "01-23-45-67-89-AB" media access control (MAC) address in the point-of-interest record 143 for the coffee shop. Hence, based on the matching "01-23-45-67-89-AB" media access control (MAC) address in this example, the location management system 140 determines that the wireless signal available to the user device 110 is associated with the coffee shop.

In certain example embodiments, after identifying a match for the wireless signal data as described herein, the location management system 140 may communicate a signal or other indication to the user device 110 to cease determining available wireless signals. That is, in certain example embodiments, the wireless signal detection module 113—when initially invoked—may periodically search for wireless signals and then communicate the wireless signal data to the location management system 140 at configurable intervals. The search for available wireless signals may continue, for example, until the wireless signal detection module 113 receives a signal to cease determining available wireless signals. For example, the signal may comprise specific instructions to cease determining available wireless signals. Alternatively, the signal may include a notification that the location management system 140 has identified a match for the received wireless data. Hence, in response to receiving the signal, the wireless signal detection module 113 ceases determining available wireless signals. By ceasing the determination of available wireless signals in such embodiments, the location management system 140 conserves battery life of the user device 110.

Returning to FIG. 2, in block 245 of FIG. 2, the location management system 140 determines that the user device 110 is at the point of interest. That is, based on determining that a wireless signal available to the user device 110 is associated with a particular point of interest, the location management system 140 determines that the user device 110 is at (or very close to) the point of interest. In other words, because the user device 110 is close enough to the point of interest to detect the wireless signal associated with the point of interest, the location management system 140 determines that the user device 110 is at the point of interest. For example, the location management system 140 determines that the user device 110 is inside the point of interest or in the parking lot of the point of interest.

In certain example embodiments, an application on the user device 110, such as the wireless signal detection module 113, may determine that the user device 110 is at the point of interest. For example, the wireless signal detection module 113 may receive a signal or other indication that the location management system 140 has identified a match for the wireless data as described herein. Based on the received signal, wireless signal detection module 113 may determine that the user device 110 is at the point of interest.

In certain example embodiments, after the location management system 140 or the wireless signal detection module 113 determines that the user device is at the point of interest, the location management system 140 or the wireless signal detection module 113 may trigger an alert for the user 101 regarding the point of interest. The alert can be any type of configurable alert. For example, the location application 112 on the user device 110 can provide an audible alert, a vibration, a visible alert (such as a text message), or any combination thereof. In certain example embodiments, the location application 112 may present point-of-interest details on the display of the user device 110, such as on a map or in e-mail. The location application 112 may also rely on any other configurable alerting process, such as sending an email, a push notification, a text message, or another communication to the user device 110 of the user 101. The location application 112 may also store the alert for later use. In certain example embodiments, the user 101 can configure the alert as desired by setting or modifying user preferences on the user device 110.

The location management system 140 or the wireless signal detection module 113 may also provide content information associated with the alert. Hence, the alert may be content based, with the content accompanying the alert notification. For example, location management system 140 may communicate content to the user device 110 accompany the alert. The location application 112, for example, receives the content information along with the alert and provides the content to the user 101 as part of the alert. Additionally or alternatively, the location management system 140 informs the location application 112 of the entrance event at or within the geofence boundary, and the location application 112 determines content to associate with the alert. The location application 112 may then store the content in the data storage unit 117 of the user device 110 until the user device 110 is determined to be at the point of interest as described herein.

The content information of the alert comprises any configurable information about one or more of the clustered points of interest. For example, if the geofence boundary encompasses a coffee shop of interest to the user 101, the content information may include a discount offer for the coffee shop. The content information may also include details regarding each merchant location, such as merchant name, location, type of merchant, products offered at the merchant, offers available to the user for the merchant, or other suitable information.

OTHER EXAMPLE EMBODIMENTS

Figure 5:
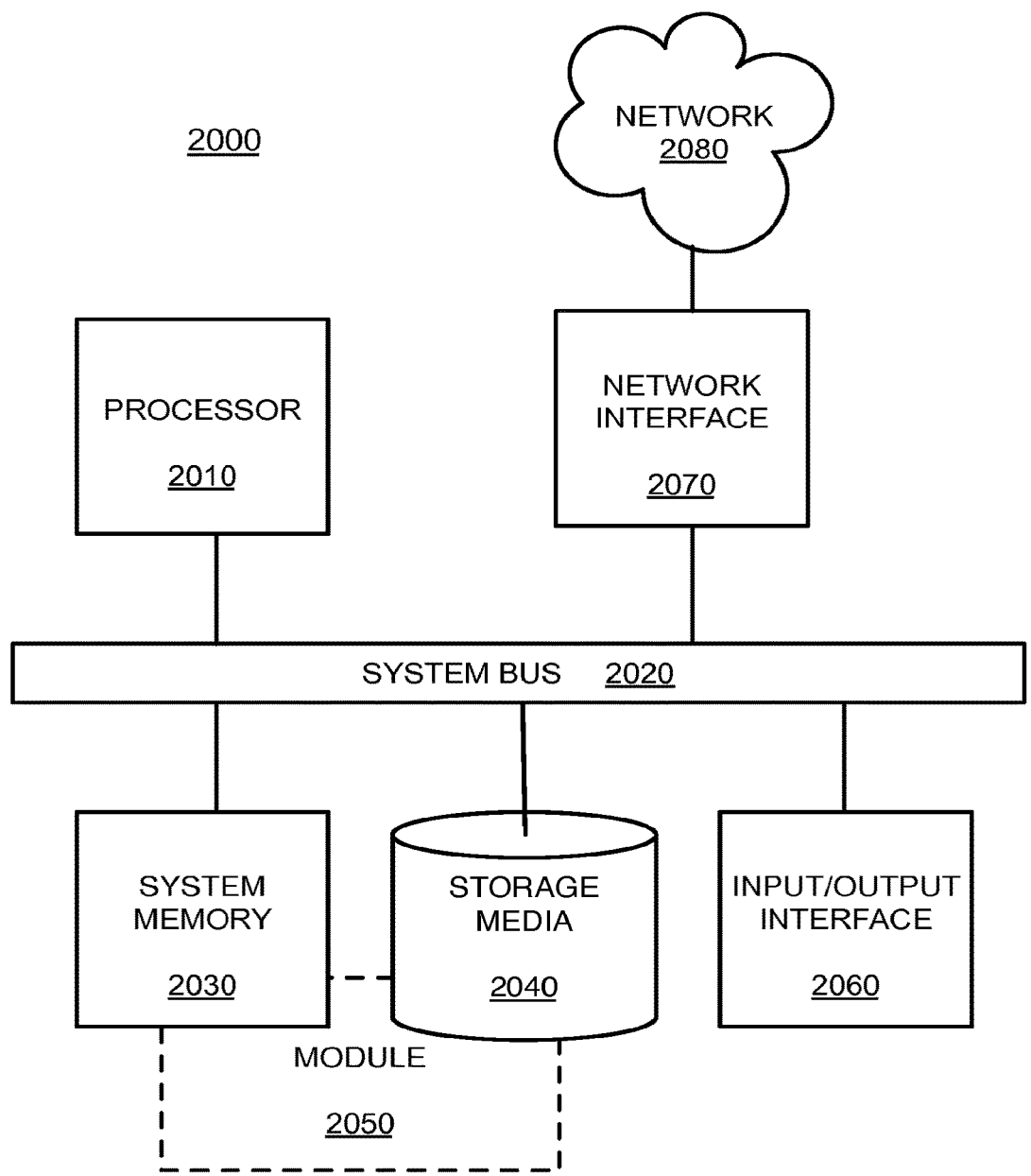
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer implemented method to determine locations of user computing devices, comprising, by one or more computing devices:

determining that a user computing device is located inside a geofence boundary encompassing a particular point of interest; and, in response to determining that the user computing device is located inside the geofence boundary encompassing the particular point of interest:

communicating instructions to the user computing device instructing the user computing device to invoke a wireless signal detection module associated with the user computing device that scans for wireless signal data in accordance with the instructions;

receiving particular wireless signal data for a particular wireless signal from the user computing device after receipt of the particular wireless signal data by the wireless signal detection module associated with the user computing device, the particular wireless signal data comprising a wireless device identifier associated with the particular wireless signal;

determining, based on the particular wireless signal data, that the particular wireless signal available to the user computing device and comprising the particular wireless device identifier is associated with the particular point of interest; and determining in response to determining that the particular wireless signal is associated with the particular point of interest, that the user computing device is at the particular point of interest.

2. The method of claim 1, wherein determining that the particular wireless signal is associated with the particular point of interest comprises, by the one or more computing devices:
identifying one or more wireless signals that are available at each of the one or more of the plurality of points of interest, each of the one or more wireless signals comprising a respective wireless device identifier;
associating, a record for the plurality of points of interest, the identified one or more wireless device identifiers with the one or more points of interest where the corresponding wireless signal is available;
reading the content of the received particular wireless signal data comprising the particular wireless device identifier;
comparing the particular wireless device identifier with the record of the plurality of points of interest comprising corresponding wireless device identifiers;
identifying, based on the comparison of the particular wireless device identifier with the record of the plurality of points of interest comprising corresponding wireless device identifiers, a match between the particular wireless device identifier and the particular wireless device identifier in the record; and
associating, in response to identifying the match for the particular wireless device identifier in the record for the point of interest, the received particular wireless signal with the particular point of interest.

3. The method of claim 1, wherein communicating the instructions to the user computing device to invoke a wireless signal detection module in response to determining that the user computing device is inside the geofence boundary results in reduced energy consumption of the user computing device.

4. The method of claim 1, wherein determining that the user computing device is inside the geofence boundary comprises receiving, by the one or more computing devices, a notification from the user computing device that the user computing device is at or inside the geofence boundary.

5. The method of claim 1, further comprising communicating, by the one or more computing devices and in response to determining that the user computing device is at the particular point of interest, instructions to the user computer device to cease invoking the wireless signal detection module.

6. The method of claim 1, wherein the wireless signal data for the particular wireless signal that is available to the user computing device comprises a Wi-Fi wireless local area network (WLAN) signal, a Bluetooth signal, a near field communication (NFC) signal, or combinations thereof.

7. The method of claim 6, wherein the particular wireless device identifier comprises a media access control (MAC) address associated with the Wi-Fi wireless local area network (WLAN) signal.

8. A system to determine locations of user computing devices, comprising:
a storage device;
a processor communicatively coupled to the storage device, wherein the processor executes application code instructions that are stored in the storage device to cause the system to:
determine, that a user computing device is located inside a geofence boundary encompassing a particular point of interest;
communicate, in response to determining that the user computing device is located inside the geofence boundary encompassing the particular point of interest, instructions to the user computing device to invoke a wireless signal detection module associated with the user computing device; and
receive, in response to invoking the wireless signal detection module associated with user computing device, wireless signal data for a particular wireless signal from the user computing device after receipt of the particular wireless signal data by the wireless signal detection module associated with the user computing device, wherein the availability of the wireless signal to the user computing device at the point of interest provides an indication that the user computing device is at the point of interest.

9. The system of claim 8, wherein the processor is further configured to execute application code instructions that are stored in the storage device to cause the system to determine, based on the indication that the user computing device is at the point of interest, that the user computing device is at the point of interest.

10. The system of claim 9, wherein the processor is further configured to execute application code instructions that are stored in the storage device to cause the system to provide an alert on the user computing device in response to determining that the user computing device is at the point of interest.

11. The system of claim 8, wherein determining that the user computing device is inside the geofence boundary comprises receiving a notification from the user computing device that the user computing device is at or inside the geofence boundary.

12. The system of claim 8, wherein the wireless signal data for the particular wireless signal that is available to the user computing device comprises a Wi-Fi wireless local area network (WLAN) signal, a Bluetooth signal, a near field communication (NFC) signal, or combinations thereof.

13. The system of claim 12, wherein the wireless signal data comprise a media access control (MAC) address associated with the Wi-Fi wireless local area network (WLAN) signal.

14. The system of claim 8, wherein the processor is further configured to execute application code instructions that are stored in the storage device to cause the system to communicate, in response to determining that the user computing device is at the particular point of interest, instructions to the user computer device to cease invoking the wireless signal detection module.

15. The system of claim 8, wherein communicating the instructions to the user computing device to invoke a wireless signal detection module in response to determining that the user computing device is inside the geofence boundary results in reduced energy consumption of the user device.

16. A computer program product to determine locations of user computing devices, comprising:
a non-transitory computer-readable storage device having computer-executable program instructions embodied thereon that when executed by a computer cause the computer to:
determine, that a user computing device is located at or inside the geofence boundary encompassing a point of interest;
invoke, in response to determining that the user computing device is located at or inside the geofence boundary, a wireless signal detection module associated with the user computing device to determine particular wireless signal data available to the user computing device;

communicate the wireless signal data to a location management system, wherein the wireless signal data comprises data identifying the point of interest; and receive, in response to communicating the wireless signal data to a location management system, a communication from the location management system to cease determining the wireless signal data available to the user computing device.

17. The computer program product of claim 16, wherein determining wireless signal data available to the user computing device in response to determining at the second time that the user computing device is at or inside the geofence boundary reduces energy consumption of the user computing device.

18. The computer program product of claim 16, wherein the data identifying the point of interest comprises a media access control (MAC) address associated with the Wi-Fi wireless local area network (WLAN) signal.

19. The computer program product of claim 16, the non-transitory computer-readable storage device further comprising computer-executable program instructions embodied thereon that when executed by the computer cause the computer to receive, in response to communicating the wireless signal data to a location management system, computer-executable instructions to provide an alert on the user computing device, wherein the alert comprises an audible alert, a vibration, a visible alert, or a combination thereof.

20. The computer program product of claim 19, the non-transitory computer-readable storage device further comprising computer-executable program instructions embodied thereon that when executed by the computer cause the computer to communicate, in response to determining that the user computing device is at the particular point of interest, instructions to the user computer device to cease invoking the wireless signal detection module.

* * * * *